United States Patent [19]
Mish et al.

[11] Patent Number: 4,976,040
[45] Date of Patent: Dec. 11, 1990

[54] POST LEVEL APPARATUS

[76] Inventors: Joseph E. Mish, P.O. Box 116, Rock Springs, Wyo. 82902; Enos Petersheim, 1804 Elk St. #210, Rock Springs, Wyo. 82901

[21] Appl. No.: 486,292

[22] Filed: Feb. 28, 1990

[51] Int. Cl.⁵ .............................. G01C 9/28
[52] U.S. Cl. ........................ 33/372; 33/382
[58] Field of Search ............. 33/373, 370, 371, 372, 33/374, 381, 382, DIG. 1, 390, 340, 353, 395, 379, 404, 451

[56] References Cited

U.S. PATENT DOCUMENTS

| | | | |
|---|---|---|---|
| 312,266 | 2/1895 | Gurley | 33/382 X |
| 1,683,065 | 9/1928 | Carpenter et al. | 33/382 |
| 2,624,953 | 1/1953 | Newcomb | 33/372 |

FOREIGN PATENT DOCUMENTS 417982 2/1967 Switzerland ................. 33/373

Primary Examiner—Harry N. Haroian
Attorney, Agent, or Firm—Leon Gilden

[57] ABSTRACT

An apparatus for indicating and proper positioning of a post, including a first and second spirit level member, with a first elastic band securing the first and second spirit level together, and a second elastic band directed exteriorly of the second spirit level member, including a loop securable to a hook mounted to the first spirit level member to encompass a post. The elastic bands each include flexible magnetic members mounted coextensively with the elastic bands, and further including apertures directed through the first and second bands to receive fasteners, such as nails, to selectively mount the organization to the post by utilization of fasteners, magnetic attraction, or frictional elastic encompassing of an associated post.

8 Claims, 4 Drawing Sheets

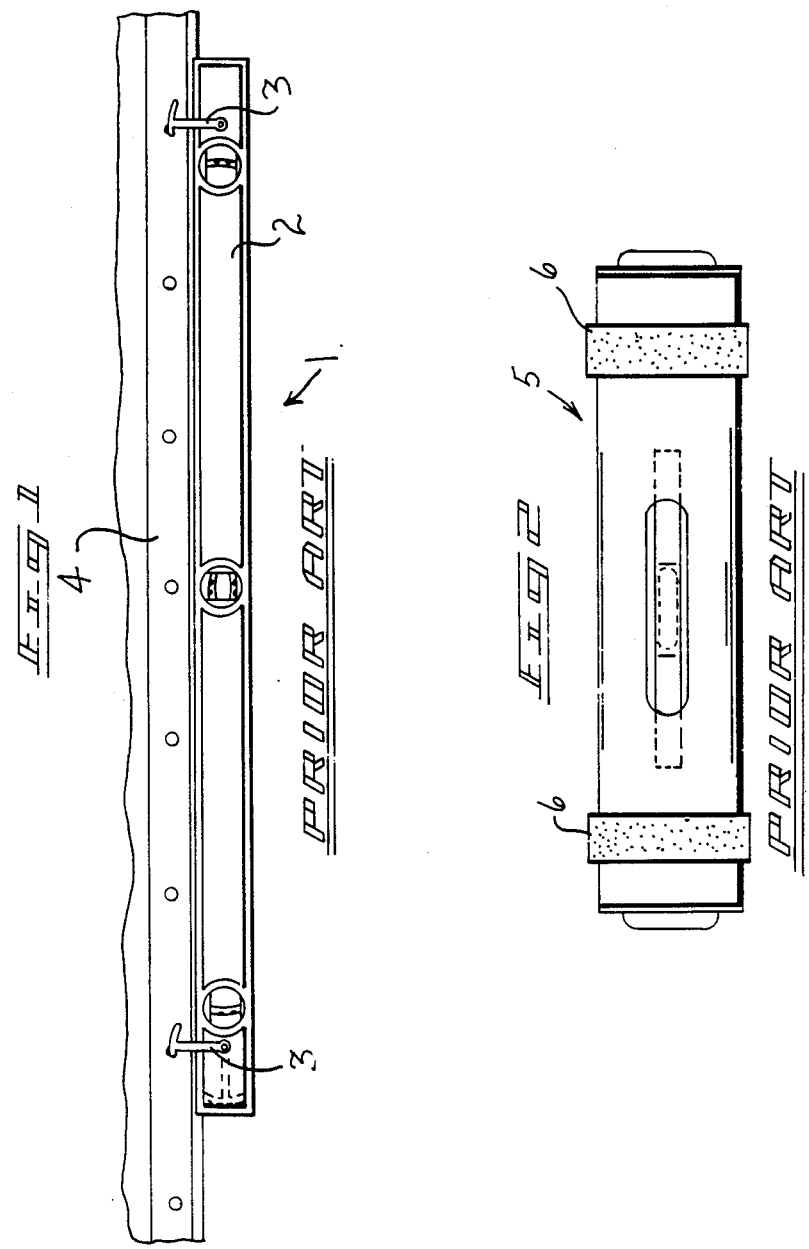

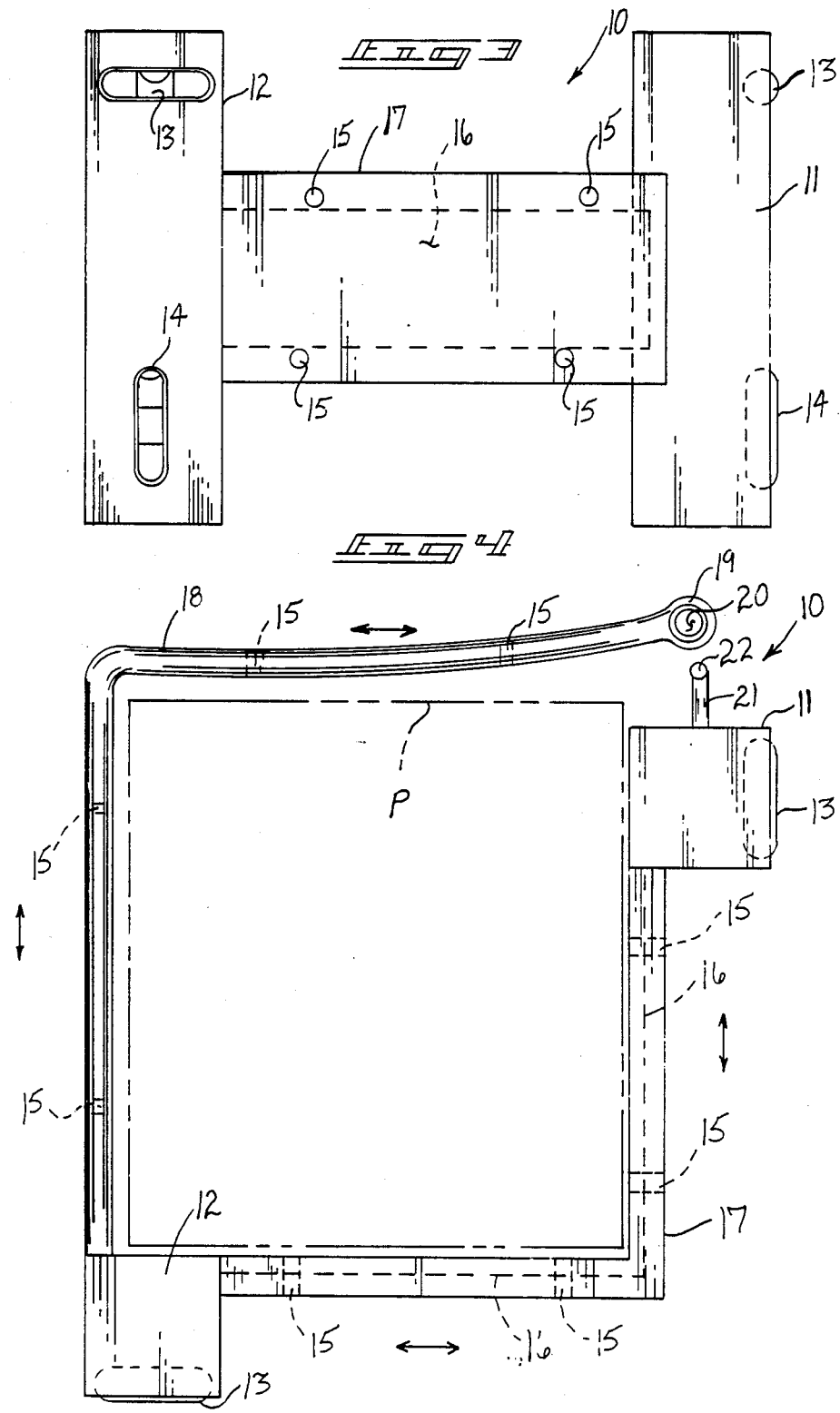

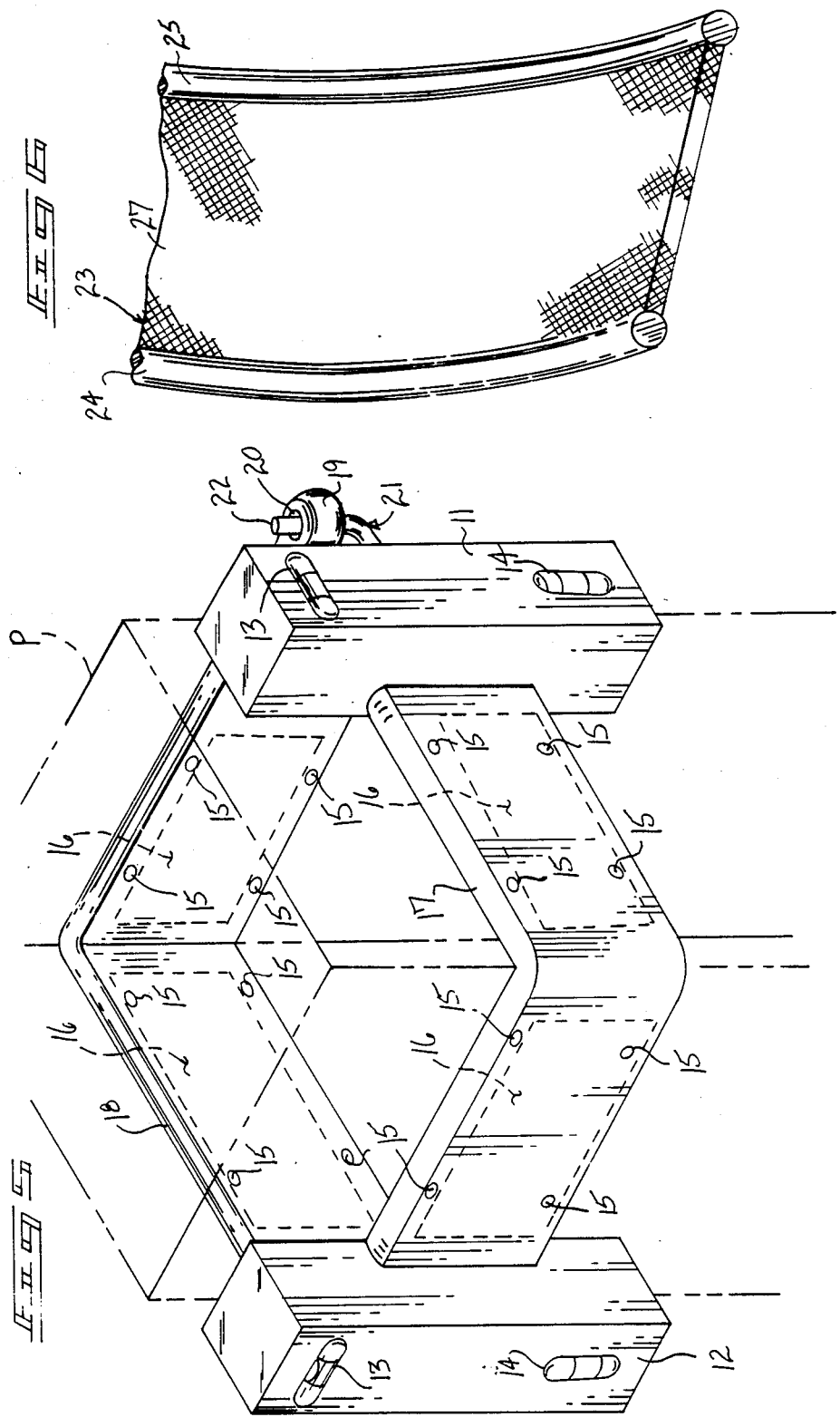

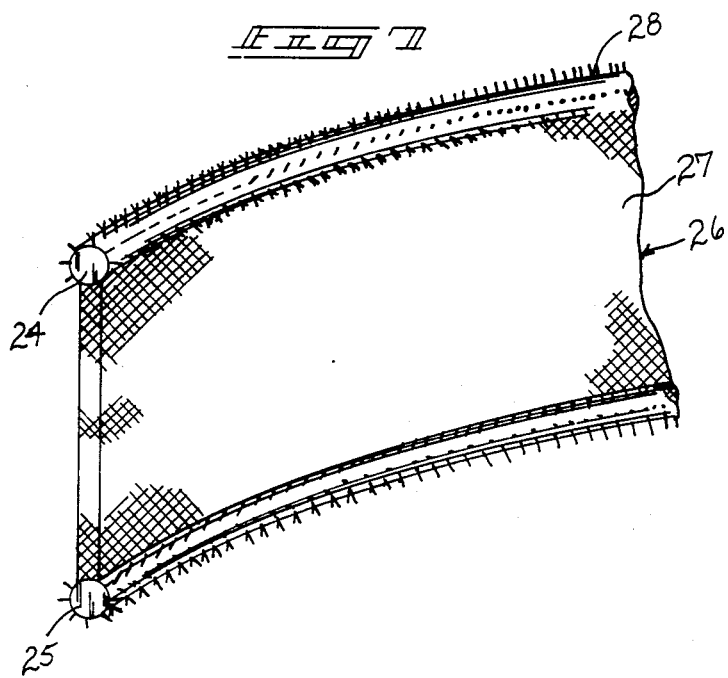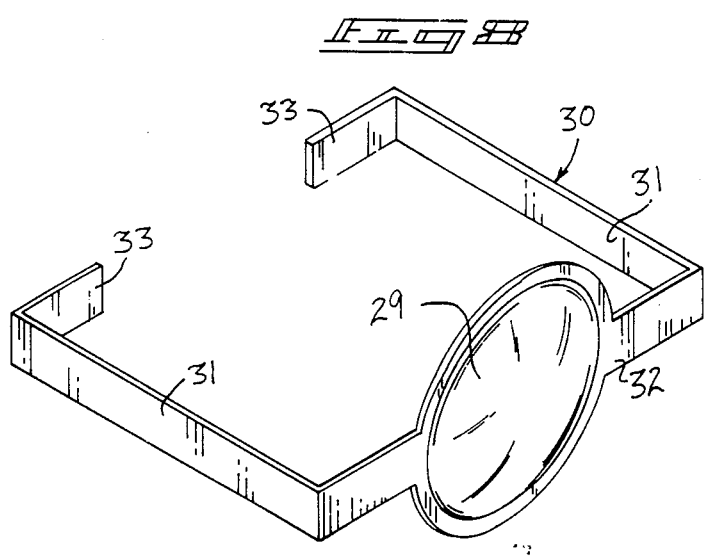

POST LEVEL APPARATUS

BACKGROUND OF THE INVENTION

1. Field of the Invention

The field of invention relates to post leveling apparatus, and more particularly pertains to a new and improved post level apparatus wherein the same is selectively securable about an associated post utilizing mechanical, magnetic, or frictional securement.

2. Description of the Prior Art

Various post level apparatus is available in the prior art. Heretofore, post level apparatus has been arranged for utilization with a particular class of posts, such as wood, metal, and the like. Examples of the prior art include U.S. Pat. No. 4,663,856 to Hall, et al., wherein a spirit level member includes a plurality of straps mounted to opposed ends of the level to secure the level about a post member.

U.S. Pat. No. 3,296,708 to Moody utilizes a single spirit level member including a plurality of hooks receivable within apertures of an associated post for securement of the level to the post.

U.S. Pat. no. 4,109,392 to Streeter sets forth a pocket level utilizing an elongate body including a plurality of spirit level members mounted therewithin.

U.S. Pat. No. 4,685,219 to Hafner utilizes a spirit level including an elongate frame for a plurality of spirit levels therebetween and a structure for limiting the movement of a spirit side plate in the respective opening towards the spirit level vial of the associated spirit level.

U.S. Pat. No. 4,635,377 to Park sets forth an adjustable T-square apparatus utilizing a generally triangular framework.

As such, it may be appreciated that there continues to be a need for a new and improved post level apparatus wherein the same addresses both the problems of ease of use, as well as effectiveness in construction and in this respect, the instant invention substantially fulfills this need.

SUMMARY OF THE INVENTION

In view of the foregoing disadvantages inherent in the known types of level apparatus now present in the prior art, the present invention provides a post level apparatus wherein the same utilizes a selective securement means from a plurality of securement means for associating a plurality of spirit level members with an associated post. As such, the general purpose of the present invention, which will be described subsequently in greater detail, is to provide a new and improved post level apparatus which has all the advantages of the prior art level apparatus and none of the disadvantages.

To attain this, the present invention includes an apparatus for indicating and proper positioning of a post, including a first and second spirit level member, with a first elastic band securing the first and second spirit level together, and a second elastic band directed exteriorly of the second spirit level member, including a loop securable to a hook mounted to the first spirit level member to encompass a post. The elastic bands each include flexible magnetic members mounted coextensively with the elastic bands, and further including apertures directed through the first and second bands to receive fasteners, such as nails, to selectively mount the organization to the post by utilization of fasteners, magnetic attraction, or frictional elastic encompassing of an associated post.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved post level apparatus which has all the advantages of the prior art level apparatus and none of the disadvantages.

It is another object of the present invention to provide a new and improved post level apparatus which may be easily and efficiently manufactured and marketed.

It is a further object of the present invention to provide a new and improved post level apparatus which is of a durable and reliable construction.

An even further object of the present invention is to provide a new and improved post level apparatus which is susceptible of a low cost of manufacture with regard to both materials and labor, and which accordingly is then susceptible of low prices of sale to the consuming public, thereby making such post level apparatus economically available to the buying public.

Still yet another object of the present invention is to provide a new and improved post level apparatus which provides in the apparatuses and methods of the prior art some of the advantages thereof, while simultaneously overcoming some of the disadvantages normally associated therewith.

Still another object of the present invention is to provide a new and improved post level apparatus wherein the same utilizes apertures for receiving fasteners, magnetic strips, or selectively an elastic surrounding band to secure a plurality of spirit level members to an associated post.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view taken in elevation of a prior art post level apparatus.

FIG. 2 is an orthographic top view of a post level apparatus developed by the prior art.

FIG. 3 is an orthographic view taken in elevation of the instant invention.

FIG. 4 is a top orthographic view of the instant invention in surrounding relationship relative to an associated post.

FIG. 5 is an isometric illustration of the instant invention secured in a surrounding relationship relative to an associated post.

FIG. 6 is an isometric sectional view of a modified elastic band utilized by the instant invention.

FIG. 7 is a sectional isometric illustration of a further modified elastic band utilized by the instant invention.

FIG. 8 is an isometric illustration of a magnifying lens configured for securement about a spirit level member of the instant invention.

DESCRIPTION OF THE PREFERRED EMBODIMENT

With reference now to the drawings, and in particular to FIGS. 1 to 8 thereof, a new and improved post level apparatus embodying the principles and concepts of the present invention and generally designated by the reference numeral 10 will be described.

FIG. 1 is illustrative of a prior art post leveling apparatus 1, including an elongate level body containing spaced spirit level members therewithin, wherein hooks 3 are receivable within apertures of an associated post 4. FIG. 2 illustrates another prior art post leveling apparatus 5 including an elongate level having spaced hook and loop fastener strap members 6 mounted adjacent opposed ends of the level body for securement to an associated post.

More specifically, the post level apparatus 10 of the instant invention essentially comprises a first and second elongate level body 11 and 12, each including a respective horizontal spirit level 13 and a vertical spirit level 14 mounted within elongate recesses of each level body, and orthogonally oriented relative to one another to provide horizontal and vertical positioning of an associated post "P".

A first elastic band 17 is mounted orthogonally relative to each elongate axis of each respective first and second elongate bodies 11 and 12 mounted integrally at its opposite ends to each level body. A second elastic band 18 is mounted orthogonally and fixedly relative to the first elongate level body 11 medially thereof at its rearward end, and includes a free end loop 19 mounted at its forward free end that includes a cylindrical bore 20 whose axis is arranged generally parallel to each longitudinal axis of each level body 11 and 12. The cylindrical bore 20 receives in a complementary manner a vertical leg 22 of an "L" shaped hook 21. The "L" shaped hook 21 includes a horizontal leg integrally mounted exteriorly of the first elongate level body 11 from an opposed side wall relative to the first elastic band 17. Understandably, the first and second elastic bands 17 and 18 permit frictional engagement and securement of the first and second level bodies 11 and 12 about an associated post "P", as illustrated in FIGS. 4 and 5 for example. Each first and second elastic band includes a plurality of apertures 15 to receive a securement member, such as nails and the like therethrough, to permit mechanical securement of the bands to the associated post "P". Further, each first and second elastic band 17 and 18 includes a plurality of flexible magnetic strips 16 mounted interiorly of each body of each elastic band, wherein upon application to metallic posts, the elastic bands and their associated magnetic strips permit magnetic securement to such a post organization.

FIG. 6 illustrates a modified elastic band to be freely substituted for one or both of the first and second elastic bands 17 and 18, including an elastic central web 27, including a top magnetic cord coextensively mounted to a top edge of the web 27 with a bottom magnetic cord 25 mounted coextensively to a bottom edge of the web 27. FIG. 7 illustrates a yet further modified elastic band 26 wherein the central web 27 includes the respective top and bottom magnetic cords 24 and 25 coextensively and fixedly mounted to upper and lower edges of the web, wherein the top and bottom magnetic cords 24 and 25 further include a matrix of rigid spikes coextensively mounted and projecting orthogonally relative to the surface of each cord 24 and 25 to further enhance securement of the modified elastic band 26 to an associated post surface.

FIG. 8 illustrates a magnifying lens reader 29 configured for mounting about each of the first and second elongate level bodies 11 and 12, wherein a magnifying lens is positioned to overlie selectively each of the horizontal and vertical spirit levels 13 and 14. The magnifying lens is mounted in alignment medially of a base leg 32 of the "U" shaped support bracket 30 that further includes spaced, parallel side legs 31 extending rearwardly and orthogonally relative to the base leg. Further, inwardly directed tabs 33 are mounted orthogonally and directed in confronting relationship towards one another to provide a surrounding perimeter for securement about an associated level body 11 or 12. The bracket 30 defines a perimeter substantially equal to the cross-sectional area of each of the level bodies 11 and 12 to permit securement of the magnifying lens to overlie a spirit level 13 or 14 to enhance visual readability of such spirit levels.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A post level apparatus comprising, in combination, a first elongate longitudinally aligned level body, and a second elongate longitudinally aligned level body, each level body including a horizontal and vertical spirit level mounted within a respective elongate recess within each level body, each respective horizontal and vertical spirit level mounted to each level body orthogonally oriented relative to each other, and first band mounted integrally and orthogonally relative to a first side of the first level body at its first end and orthogonally and integrally mounted to a second side of the second level body at a second end of the band, and a second band mounted to a first side of the second level body integrally and orthogonally thereto, and the second end of the second band defining a free end for securement about an associated post, and wherein the first band and the second band are elastic, and wherein the free end of the second band includes a loop defining a vertical bore directed therethrough, the vertical bore oriented generally parallel to a second side of the first level body, and an "L" shaped hook mounted to the second side of the first level body.

2. An apparatus as set forth in claim 1 wherein the "L" shaped hook includes a vertical leg defined by a predetermined cross-sectional configuration complementary to a cross-sectional configuration of the vertical bore.

3. An apparatus as set forth in claim 2 wherein each elastic band includes a matrix of apertures orthogonally directed through the elastic bands for receiving mechanical fasteners to secure the elastic bands to the post.

4. An apparatus as set forth in claim wherein each band further includes a plurality of flexible magnetic members mounted integrally to each band.

5. An apparatus as set forth in claim 4 wherein each flexible magnetic strip comprises an upper and lower magnetic cord, each cord coextensively mounted to a respective upper and lower edge of each band.

6. An appratus as set forth in claim 5 wherein each cord includes a matrix of rigid spikes directed exteriorly and orthogonally relative to each cord to enhance mechanical securement of each band to the post.

7. An apparatus as set forth in claim 6 including a magnifying lens selectively securable to each elongate level body to overlie each spirit level selectively.

8. An apparatus as set forth in claim 7 wherein the magnifying lens includes a generally "U" shape including a base leg and spaced parallel side legs, the magnifying lens mounted in alignment and medially of the base leg, and the side legs including tab members directed orthogonally and in an aligned confronting relationship relative to one another at free terminal ends of each side leg spaced from the base leg and the tabs, the side legs and the base leg define a perimeter substantially equal to a cross-sectional level body configuration to complementarily receive a level body within the perimeter of the "U" shaped bracket.

* * * * *